(12) United States Patent
Silverman

(10) Patent No.: US 6,591,097 B1
(45) Date of Patent: Jul. 8, 2003

(54) METHODS AND DEVICES FOR DELETING VOICEMAILS USING A DELETION PAGE

(75) Inventor: David P. Silverman, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/273,714

(22) Filed: Mar. 22, 1999

(51) Int. Cl.[7] .............................................. H04M 11/10
(52) U.S. Cl. ...................... 455/413; 455/414; 455/567; 340/7.2; 340/7.51; 340/7.52; 340/7.58
(58) Field of Search ................................. 455/412, 413, 455/414, 415, 458, 567; 379/88.12, 88.13, 88.15; 340/7.41, 7.47, 7.52, 7.2

(56) References Cited

U.S. PATENT DOCUMENTS

| | | | |
|---|---|---|---|
| 5,260,986 A | * | 11/1993 | Pershan ........................ 379/88 |
| 5,418,835 A | * | 5/1995 | Frohman et al. ............... 379/88 |
| 5,657,376 A | | 8/1997 | Espeut et al. |
| 5,742,905 A | | 4/1998 | Pepe et al. |
| 5,802,466 A | * | 9/1998 | Gallant et al. ............... 455/413 |
| 5,944,786 A | * | 8/1999 | Quinn ...................... 379/88.12 |
| 5,995,597 A | * | 11/1999 | Woltz et al. .............. 379/88.15 |
| 6,134,432 A | * | 10/2000 | Holmes et al. ............. 455/412 |
| 6,295,341 B1 | * | 9/2001 | Muller ..................... 379/88.18 |
| 6,418,307 B1 | * | 7/2002 | Amin ......................... 455/413 |

* cited by examiner

Primary Examiner—Edward F. Urban
Assistant Examiner—Temica M. Davis

(57) ABSTRACT

Unique, voicemail pages are used to improve communication systems which combine both voicemail and paging devices. A "deletion", voicemail page is used to automatically delete previously sent voicemail pages in a pager at virtually the same time as a corresponding voicemail message is being deleted in a voicemail system. Other unique voicemail pages make it possible to restrict the notification of a received voicemail page and provide the capability of listening to voicemail messages while viewing a separately sent, corresponding page on a pager.

86 Claims, 1 Drawing Sheet

METHODS AND DEVICES FOR DELETING VOICEMAILS USING A DELETION PAGE

BACKGROUND OF THE INVENTION

Today, there exists communication systems which combine the capabilities of a number of devices which originally were developed to be used separately. For example, some communication systems link voicemail systems with communication pagers.

Marrying such systems together provides advantages. For example, instead of calling into a voicemail system in order to check on whether or not any messages have been left, a user equipped with a communications pager can be notified via a "page" that she has voicemail messages and at the same time receive information, e.g., a telephone number, about the source of the voicemail message. With the introduction of two-way, digital communication pagers this notification may occur within seconds after a voicemail message has been left with a remote, voicemail system. Once a page is received it may then be stored in memory within a pager for later reference.

Many times the words "notification" and "notify" have dual meanings within the context of paging systems. These words mean both a physical and visual notification. A received page (e.g., electronic page, not a physical page of paper) notifies a user of a pager that she has a new voicemail by both displaying information on a visual display and by physically outputting an audio tone or causing the pager to vibrate, for example.

As people have begun to routinely use these combinations of devices, some drawbacks have come to the forefront.

For example, sometime after a user is informed via a page that she has a voicemail message she will call in via a telephone or computer of some kind and obtain her voicemail messages. Typically, once she has listened to a message the voicemail system will give her the choice of saving or deleting a voicemail message. Suppose for the sake of our example, she chooses to delete the message from the voicemail system. Sometime later she again checks her pager and discovers that it contains a total list of pages, some of which have already been responded to and even deleted. Unfortunately, she cannot remember which pages she has already listened to and which ones still remain to be reviewed. Worse yet, she has forgotten to manually delete from her pager those messages she has already deleted from her voicemail system. Frustration and confusion from such a scenario detracts from the overall "user friendly" operation of such systems.

Other times an originator of a voicemail may forget to leave his telephone number as a part of his voicemail message. In these instances it may be impossible to timely respond to such a message no matter how fast a page is received.

Still other times it may be desirable to receive pages without a physical notification.

Accordingly, it is an object of the present invention to provide improvements to systems which have voicemail and/or paging capability.

Another object of the present invention is to provide for the "automatic" deletion of a page stored in a pager through the transmission and reception of a unique, deletion page.

It is another object of the present invention to provide for the automatic deletion of a page stored in a pager where a deletion page is transmitted and then received by the pager at substantially the same time as a corresponding voice mail message in a voicemail system is deleted.

It is a further object of the present invention to provide for another unique deletion page or a digital voicemail page comprising a data field which restricts physical notification that the deletion page or voice mail page has in fact been received.

It is yet another object of the present invention to provide for the transmission of still another unique voice mail page to a pager at substantially the same time as a user of the pager listens to a corresponding voicemail message in a voicemail system, where the voicemail page comprises ANI data identifying at least the telephone number of the originator of the voicemail message.

Other objectives, features and advantages of the present invention will become apparent to those skilled in the art from the following description taken in conjunction with the accompanying drawings.

SUMMARY OF THE INVENTION

In accordance with the present invention there provided novel devices and methods for overcoming the frustration and confusion which may result from using existing systems which combine voicemail and paging systems.

Specifically, the present invention envisions the transmission and subsequent reception of unique voicemail pages. For instance, one embodiment envisions transmission of a "deletion" page for automatically deleting a previously sent voicemail page stored in a pager at substantially the same time as a voicemail message is deleted in a separate voicemail system. Even more specifically, the present invention envisions a communications system which comprises a voicemail unit for transmitting a digital deletion page; a pager for receiving the deletion page, the pager further comprising a control unit for deleting a first voicemail page upon reception of the deletion page. The voicemail unit may be further adapted to transmit a deletion page substantially at the same time as a corresponding voice mail message is deleted and the pager may further be adapted to receive a deletion page substantially at the same time as a corresponding voice mail message is deleted.

In accordance with another aspect of the present invention there is provided a communications system comprising a voicemail unit, where the voicemail unit is adapted to transmit a second voicemail page comprising a data field to a pager which restricts notification by the pager that the voicemail page has been received.

In accordance with still another aspect of the present invention there is provided a communications system comprising a voicemail unit, where the voicemail unit is adapted to transmit a third voicemail page, generated at substantially the same time as a user listens to a corresponding voicemail message, to a pager and the pager is adapted to receive the third voice mail page at substantially the same time as well.

In accordance with yet another embodiment of the invention, there are provided methods for realizing the features and advantages offered by the present invention.

The present invention and its advantages can be best understood with reference to the drawings, detailed description of the preferred embodiments and claims that follow.

DETAILED DESCRIPTION OF THE INVENTION

Figure 1:
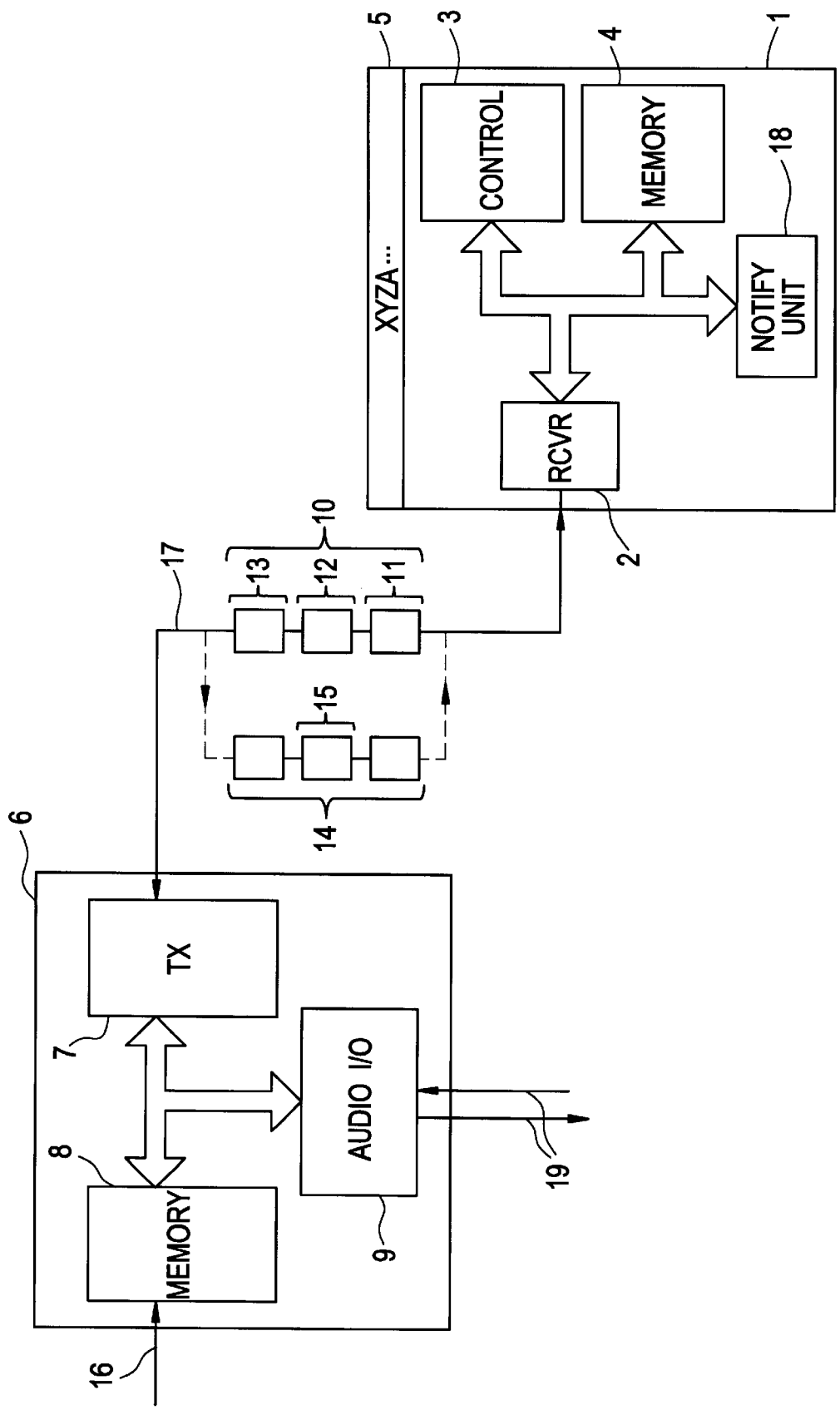
FIG. 1 depicts a communications system comprising a voicemail unit and pager according to one embodiment of the present invention.

Referring to FIG. 1, there is shown a pager 1 and voicemail unit 6 according to an embodiment of the present invention. Together, the pager 1 and voicemail unit 6 make up a communications system.

In a one embodiment, the voicemail unit 6 comprises a transmission unit or means 7, voicemail memory or means 8 for storing voicemail messages and an audio input/output ("I/O") unit or means 9.

The voicemail unit 6 transmits digital signals, referred to as pages, to the pager 1 via transmission unit 7 and two-way path 17. These signals may be digital or analog signals. The pager 1 comprises a receiving unit or means 2 for receiving the pages, a page memory or memory means 4 for storing received pages, a control unit or means 3, a display unit or means 5 for displaying pages and a notification unit or means 18. Though the voicemail unit 6 is shown having a transmission unit only and the pager 1 is shown having a receiving unit only, it should be understood that both the voicemail unit 6 and pager 1 are capable of two-way communications. In the embodiment discussed hereafter, however, the pager 1 comprises a receive-only unit. The additional transmission/receiving units required to be added for two-way communications are not shown, but their operation is well known in the art and is not needed to explain the features of the present invention.

In a typical scenario, a far-end caller or originator 16 leaves a voicemail message for a user of the pager 1 in voicemail memory 8 of voicemail unit 6. Thereafter, voicemail unit 6 generates and transmits a voicemail page to pager 1 indicating that a voicemail message has been left for the user. In a preferred embodiment, the digital voicemail page is transmitted to the pager 1 within seconds after the original message is received by the voicemail unit 6. The receiving unit 2 receives the voicemail page and displays it on display unit 5 providing a user with a visual notification that a page has been received. In a typical scenario, the pager 1 would also output a notification signal, such as an audio beep, tone or vibrating signal via notification unit 18 providing the user with a physical notification that a page has been received. Sometime after a page is received, the user then calls the voicemail unit 6 via a communications channel or pathway 19 (only partially shown) to listen to her voicemail messages. The voicemail messages may be stored in memory 8 and may be output via audio I/O 9.

Throughout the explanation and examples which follow, the word "page" will refer to those signals sent to pager 1 while the word "message" will refer to those voicemail messages sent to, and stored in, voicemail unit 6. It should be understood, that in a preferred embodiment of the present invention there is a one-to-one correspondence between a voicemail page and a voicemail message. Said another way, each voicemail page received by the pager 1 is associated with a specific voicemail message stored in voicemail unit 6.

Once she has listened to a particular message, she may then delete that message from voicemail unit 6 using techniques well known in the art. In addition, however, in a preferred embodiment of the present invention, the voicemail unit 6 will then transmit a deletion page 10 to the pager 1. This deletion page 10 is generated and transmitted at substantially the same time as the corresponding voicemail message is deleted. Because it takes a relatively short time for the deletion page 10 to be received by the pager 1, the receiving unit 2 receives the deletion page 10 substantially at the same time as the corresponding voicemail page is deleted. Thereafter, control unit 3 deletes a voicemail page which may be stored in page memory 4 or displayed on display 5. The voicemail page deleted by the control unit 5 is the page which was originally sent and is associated on a one-to-one basis with the deleted voicemail message.

Thus, for each voicemail message stored in unit 6 there is an associated voicemail page which is first sent to pager 1 and, eventually, an associated deletion page 10 which is later sent to pager 1 once the message has been deleted.

The deletion page 10 may comprise a data stream which comprises a number of different data fields, such as a delete header field 11 telephone number field 12 and notification field 13. The delete header field may be used to distinguish the deletion page from a normal voicemail page. It should be understood that a typical voicemail page does not comprise a delete header field. Rather, in a typical voicemail page, the delete header field is replaced with a header field which helps identify the voicemail page from all other voicemail pages. Alternatively, the delete header page may comprise a typical header page with the addition of a delete "flag" or the like. The exact structure of the delete header field is not vital to realizing the advantages of the present invention and is left to those skilled in the art. The telephone number field typically comprises the telephone number of the far end caller while the notification field 13 comprises data which instructs the pager 1 to trigger (or not to trigger) notification unit 18. In another embodiment of the invention the first voicemail page may be viewed as comprising only a telephone number.

In another embodiment of the invention, the voicemail unit 6 is further adapted to transmit a deletion page which comprises a data field where the data restricts the notification unit 18 from notifying a user of the pager 1 that such a deletion page has been received. Said another way, in this embodiment of the invention there is no need to inform the user that she is receiving a page because, in fact, the page she is receiving is designed to delete an earlier page; not to inform her that she has received a new voicemail message. Thus, no audio beep, tone or vibration signal will be output from pager 1. Conversely, the deletion page may comprise a data field which allows the output of such signals.

The ability to transmit a page which comprises a data field for restricting the pager 1 from outputting such a "notification signal" is not limited to the situation where a deletion page is sent. To the contrary, the present invention envisions transmitting such a voicemail page without regards to whether a corresponding voicemail message has been deleted by a user. To avoid confusion, this voicemail page may be referred to as a second voicemail page.

In addition to envisioning the "automatic" deletion of voicemail pages and the ability to restrict the output of a notification signal, the present invention also provides for the transmission of other voicemail pages designed to give such systems additional flexibility. In one embodiment, the voicemail unit 6 transmits a third voicemail page 14 while the user is listening to a voicemail message stored in unit 6. This feature allows the user to both listen to her voicemail messages and visually view a corresponding voicemail page on display 5, for example. It may come in handy in situations where the far end caller has failed to leave his telephone number in the audio voicemail message. Under such a situation, the third voicemail message 14 sent to the pager 1 may comprise a telephone data field 15 comprising ANI type data which will provide the user with the telephone number of the far end caller. Again, because transmission of the pages occurs quickly, the third voicemail page may be generated and transmitted at substantially the same time as the user is listening to a corresponding voicemail message and received by the pager 1 at substantially the same time as well. Thereafter, the third voicemail page may be displayed. In a preferred embodiment the third voicemail page is displayed at substantially the same time as the user is listening to a corresponding voicemail message. The ANI data may be transmitted in any one of the exemplary voicemail or deletion pages mentioned above.

It should be understood that the pager 1 is not directly receiving the call 16 from a far end user. Thus, the pager 1 will not normally have access to caller identification data or the like. Nonetheless, the voicemail unit 6 may transmit ANI-type data to the pager 1 in order to provide the user with the far end caller's telephone number.

Ordinarily, the telephone number field 12 and ANI data field 15 will both comprise a telephone number, but this is not always the case.

In an alternative embodiment of the invention, the voicemail unit 6 may further comprise a receiver or receiving means for receiving ANI-type data from a far end caller. The voicemail unit 6 may be further adapted to receive calls 16 comprising ANI data from far end callers and convert the audio information to text. In this manner, if a far end caller leaves an audio message containing his telephone number the voicemail unit 6 will convert this audio message into text and send it as a part, for example, of telephone data fields 12,15.

Though the above explanation has used examples of physical devices to explain the present invention, methods embodying the same steps as outlined above are within the scope of the present invention. It should be noted, however, that the present invention may be realized by methods using different sequences of events. For example, the deletion page may be received and deleted in one step, rather than in two as described above. In addition, a received voicemail page may be deleted from the display 5 prior to being deleted from memory 4 or vice-versa.

Though shown as separate units, the units making up voicemail unit 6 and pager 1 may be combined or further broken down into additional units using designs well known in the art.

Though the present invention has been described with respect to a combination of a voicemail system and pager, many of the same features are applicable to other combinations as well. For instance, other types of pages besides voicemail pages may be sent to a pager. Once this information has been sent it may be deleted, at which time the system which forwarded the page may then send a deletion page or the like.

It is to be understood that changes and variations may be made without departing from the spirit and scope of this invention as defined by the claims that follow.

I claim:

1. A communications pager comprising:
a receiving unit for receiving a deletion page from a voicemail unit;
a display unit for displaying a first voicemail page; and
a control unit for deleting the first voicemail page upon reception of the deletion page.

2. The pager as in claim 1 further comprising a page memory for storing the first voicemail page.

3. The pager as in claim 2 wherein the control unit is further adapted to delete the stored first voicemail page from the page memory.

4. The pager as in claim 1 wherein the pager comprises a two-way communications pager.

5. The pager as in claim 1 wherein the deletion page comprises a digital signal.

6. The pager as in claim 1 wherein the deletion page comprises an analog signal.

7. The pager as in claim 1 wherein the receiving unit is further adapted to receive the deletion page substantially at the same time as a corresponding voice mail message is deleted.

8. The pager as in claim 1 wherein the receiving unit is further adapted to receive the deletion page where the deletion page comprises a data field which causes the pager to notify a user that the deletion page has been received.

9. The pager as in claim 1 wherein the receiving unit is further adapted to receive the deletion page where the deletion page comprises a data field which restricts notification that the deletion page has been received.

10. The pager as in claim 1 wherein the receiving unit is further adapted to receive a second voicemail page comprising a data field which restricts notification that the voicemail page has been received.

11. The pager as in claim 10 wherein the display unit is further adapted to display the second voicemail page.

12. The pager as in claim 1 wherein the receiving unit is further adapted to receive a third voice mail page at substantially the same time as a user of the pager listens to a corresponding voicemail message.

13. The pager as in claim 12 wherein the display unit is further adapted to display the received third voicemail page at substantially the same time as the user of the pager listens to the corresponding voicemail message.

14. The pager as in claim 12 wherein the third voice mail page comprises ANI data identifying at least the telephone number of the originator of the voicemail message.

15. The pager as in claim 1 wherein the receiving unit is further adapted to receive a third voicemail page generated at substantially the same time as a user listens to a corresponding voicemail message.

16. The pager as in claim 15 wherein the display unit is further adapted to display the received third voicemail page at substantially the same time as a user of the pager listens to a corresponding voicemail message.

17. The pager as in claim 15 wherein the third voice mail page comprises ANI data identifying at least the telephone number of the originator of the corresponding voicemail message.

18. A communications pager comprising:
receiving means for receiving a deletion page from a voicemail unit;
display means for displaying a first voicemail page; and
control means for deleting the first voicemail page upon reception of the deletion page.

19. The pager as in claim 18 further comprising page memory means for storing the first voicemail page.

20. The pager as in claim 18 wherein the control means is further adapted to delete the stored first voicemail page from the page memory means.

21. The pager as in claim 18 wherein the pager comprises a two-way communications pager.

22. The pager as in claim 18 wherein the deletion page comprises a digital signal.

23. The pager as in claim 18 wherein the deletion page comprises an analog signal.

24. The pager as in claim 18 wherein the receiving means is further adapted to receive the deletion page substantially at the same time as a corresponding voice mail message is deleted.

25. The pager as in claim 18 wherein the deleted first voicemail page is associated with a deleted voice mail message.

26. The pager as in claim 18 wherein the receiving means is further adapted to receive the deletion page where the deletion page comprises a data field which causes the pager to notify a user that the deletion page has been received.

27. The pager as in claim 18 wherein the receiving means is further adapted to receive the deletion page where the deletion page comprises a data field which restricts notification that the deletion page has been received.

28. The pager as in claim 18 wherein the receiving means is further adapted to receive a second voicemail page comprising a data field which restricts notification that the voicemail page has been received.

29. The pager as in claim 28 wherein the display means is further adapted to display the second voicemail page.

30. The pager as in claim 18 wherein the receiving means is further adapted to receive a third voice mail page at substantially the same time as a user of the pager listens to a corresponding voicemail message.

31. The pager as in claim 30 wherein the display means is further adapted to display the third voicemail page at substantially the same time as the user of the pager listens to the corresponding voicemail message.

32. The pager as in claim 30 wherein the third voice mail page comprises ANI data identifying at least the telephone number of the originator of the voicemail message.

33. The pager as in claim 18 wherein the receiving means is further adapted to receive a third voicemail page generated at substantially the same time as a user listens to a corresponding voicemail message.

34. The pager as in claim 33 wherein the display means is further adapted to display the third voicemail page at substantially the same time as a user of the pager listens to a corresponding voicemail message.

35. The pager as in claim 33 wherein the third voicemail page comprises ANI data identifying at least the telephone number of the originator of the corresponding voicemail message.

36. A communications system comprising:
   a voicemail unit for transmitting a deletion page;
   a pager for receiving the deletion page, the pager further comprising a display unit for displaying a first voicemail page and a control unit for deleting the first voicemail page upon reception of the deletion page.

37. The system as in claim 36 wherein the pager further comprises a page memory for storing the first voicemail page.

38. The system as in claim 37 wherein the control unit is further adapted to delete the first voicemail page from the page memory.

39. The system as in claim 36 wherein the deletion page comprises a digital signal.

40. The system as in claim 36 wherein the deletion page comprises an analog signal.

41. The system as in claim 36 wherein the system comprises a two-way communications system.

42. The system as in claim 36 wherein the voicemail unit is further adapted to transmit the deletion page substantially at the same time as a corresponding voice mail message is deleted and the pager is further adapted to receive the deletion page substantially at the same time as the corresponding voice mail message is deleted.

43. The system as in claim 36 wherein the deleted first voicemail page is associated with a deleted voice mail message.

44. The system as in claim 36 wherein the voicemail unit is further adapted to transmit the deletion page, where the deletion page comprises a telephone number data field.

45. The system as in claim 36 wherein the voicemail unit is further adapted to transmit the deletion page, where the deletion page comprises a delete header data field.

46. The system as in claim 36 wherein the voicemail unit is further adapted to transmit the deletion page, where the deletion page comprises a data field which causes the pager to notify a user that the deletion page has been received.

47. The system as in claim 36 wherein the voicemail unit is further adapted to transmit the deletion page, where the deletion page comprises a data field which restricts notification that the deletion page has been received.

48. The system as in claim 36 wherein the voicemail unit is further adapted to transmit a second voicemail page comprising a data field which restricts notification that the voicemail page has been received.

49. The system as in claim 48 wherein the display unit is adapted to display the second voicemail page.

50. The system as in claim 36 wherein the voicemail unit is further adapted to transmit a third voicemail page generated at substantially the same time as a user of the pager listens to a corresponding voicemail message and the pager is further adapted to receive the third voice mail page at substantially the same time as the user listens to the corresponding voicemail message.

51. The system as in claim 50 wherein the pager display unit is adapted to display the third voicemail page at substantially the same time as the user listens to the corresponding voicemail message.

52. The system as in claim 51 wherein the third voice mail page comprises ANI data identifying at least the telephone number of the originator of the corresponding voicemail message.

53. The system as in claim 36 wherein the voicemail unit is adapted to receive caller identification data and further adapted to transmit ANI data derived from the caller identification data to the pager.

54. A voicemail unit for transmitting a deletion page to a pager.

55. The voicemail unit as in claim 54 further comprising a voicemail memory for storing voicemail messages.

56. The voicemail unit as in claim 55 wherein the voicemail unit is further adapted to transmit the deletion page substantially at the same time as a corresponding voicemail message is deleted from the voicemail memory.

57. The voicemail unit as in claim 54 wherein the voicemail unit is further adapted to transmit the deletion page, where the deletion page comprises a data field which causes a pager to notify a user of the pager that the deletion page has been received.

58. The voicemail unit as in claim 54 wherein the voicemail unit is further adapted to transmit the deletion page, where the deletion page comprises a data field which restricts notification by a pager that the deletion page has been received.

59. The voicemail unit as in claim 54 wherein the voicemail unit is further adapted to transmit a second digital voicemail page comprising a data field which restricts notification by a pager that the voicemail page has been received.

60. The voicemail unit as in claim 54 wherein the voicemail unit is further adapted to transmit a third digital voicemail page generated at substantially the same time as a user of the voicemail unit listens to a corresponding voicemail message.

61. The voicemail unit as in claim 60 wherein the third voice mail page comprises ANI data identifying at least the telephone number of the originator of the corresponding voicemail message.

62. The voicemail unit as in claim 54 wherein the voicemail unit is adapted to receive caller identification data and further adapted to transmit ANI data derived from the caller identification data to a pager.

63. A voicemail unit comprising transmission means for transmitting a deletion page to a pager.

64. The voicemail unit as in claim 63 further comprising voicemail memory means for storing voicemail messages.

65. The voicemail unit as in claim 63 wherein the transmission means is further adapted to transmit the deletion page substantially at the same time as a corresponding voicemail message is deleted from the voicemail memory.

66. The voicemail unit as in claim 63 wherein the transmission means is further adapted to transmit the deletion page, where the deletion page comprises a data field which causes a pager to notify a user of the pager that the deletion page has been received.

67. The voicemail unit as in claim 63 wherein the transmission means is further adapted to transmit the deletion page, where the deletion page comprises a data field which restricts notification by a pager that the deletion page has been received.

68. The voicemail unit as in claim 63 wherein the transmission means is further adapted to transmit a second digital voicemail page comprising a data field which restricts notification by a pager that the voicemail page has been received.

69. The voicemail unit as in claim 63 wherein the transmission means is further adapted to transmit a third digital voicemail page generated at substantially the same time as a user of the voicemail unit listens to a corresponding voicemail message.

70. The voicemail unit as in claim 69 wherein the third voice mail page comprises ANI data identifying at least the telephone number of the originator of the corresponding voicemail message.

71. The voicemail unit as in claim 63 wherein the voicemail unit further comprises receiving means for receiving caller identification data and the transmission means is adapted to transmit ANI data derived from the caller identification data to a pager.

72. A communications method comprising:

receiving a deletion page from a voicemail unit;

displaying a first voicemail page; and deleting the first voicemail page upon reception of the deletion page.

73. The method as in claim 72 further comprising deleting the first voicemail page from a page memory.

74. The method as in claim 72 further comprising deleting the first voicemail page from the display unit.

75. The method as in claim 72 wherein the deletion page is a digital signal.

76. The method as in claim 72 wherein the deletion page is an analog signal.

77. The method as in claim 72 wherein the method comprises two-way communications.

78. The method as in claim 72 wherein the deleted first voicemail page is associated with a deleted voice mail message.

79. The method as in claim 72 wherein the deletion page comprises a notification data field.

80. The method as in claim 72 Wherein the deletion page comprises a notification data field which restricts notification.

81. The method as in claim 80 further comprising displaying the received second voicemail page.

82. The method as in claim 81 further comprising displaying the third voicemail page at substantially the same time as it is output.

83. The method as in claim 81 wherein the third voice mail page comprises ANI data identifying at least the telephone number of the originator of a stored voicemail message.

84. The method as in claim 72 further comprising receiving a second digital voicemail page comprising a data field which restricts notification.

85. The method as in claim 72 further comprising receiving a third voice mail page at substantially the same time as the corresponding voicemail message is output.

86. The method as in claim 72 further comprising receiving caller identification data and transmitting ANI data derived from the caller identification data.

* * * * *